US008559707B2

(12) United States Patent
Wu

(10) Patent No.: US 8,559,707 B2
(45) Date of Patent: Oct. 15, 2013

(54) SYSTEM AND METHOD FOR FACE DETECTION USING FACE REGION LOCATION AND SIZE PREDICTIONS AND COMPUTER PROGRAM PRODUCT THEREOF

(75) Inventor: Yi-Ta Wu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 337 days.

(21) Appl. No.: 13/180,804

(22) Filed: Jul. 12, 2011

(65) Prior Publication Data

US 2012/0155757 A1 Jun. 21, 2012

(30) Foreign Application Priority Data

Dec. 15, 2010 (TW) .............................. 99143980 A

(51) Int. Cl.
*G06K 9/00* (2006.01)
(52) U.S. Cl.
USPC ....................................................... 382/165
(58) Field of Classification Search
USPC ......... 382/103, 115, 118, 164–165, 170–171, 382/180–181, 276, 289, 294; 348/169–172
See application file for complete search history.

(56) References Cited

U.S. PATENT DOCUMENTS

| | | | |
|---|---|---|---|
| 6,188,777 B1 * | 2/2001 | Darrell et al. ................. | 382/103 |
| 6,463,163 B1 | 10/2002 | Kresch | |
| 7,190,829 B2 | 3/2007 | Zhang et al. | |
| 7,212,664 B2 * | 5/2007 | Lee et al. ...................... | 382/154 |
| 7,236,629 B2 * | 6/2007 | Cooper et al. ................ | 382/171 |
| 7,343,028 B2 | 3/2008 | Ioffe et al. | |
| 7,369,687 B2 | 5/2008 | Kawato et al. | |
| 7,542,624 B1 * | 6/2009 | Koch ............................ | 382/294 |
| 7,590,267 B2 | 9/2009 | Xiao et al. | |
| 8,027,521 B1 * | 9/2011 | Moon et al. .................. | 382/118 |
| 8,094,971 B2 * | 1/2012 | Guerzhoy et al. ............ | 382/289 |
| 8,385,609 B2 * | 2/2013 | Piramuthu et al. ............ | 382/118 |
| 2010/0158376 A1 * | 6/2010 | Klosterman et al. .......... | 382/180 |

FOREIGN PATENT DOCUMENTS

| | | |
|---|---|---|
| CN | 101388114 A | 3/2009 |
| CN | 101794385 A | 8/2010 |
| TW | 420939 | 2/2001 |
| TW | 200719871 | 6/2007 |

OTHER PUBLICATIONS

China Patent Office, Office Action, Patent Application Serial No. CN201010622457.8, Feb. 28, 2013, China.
Paul Viola and Michael Jones, "Rapid object detection using boosted cascade of simple features," Proc. IEEE Computer Society Conference on Computer Vision and Pattern Recognition (CVPR), pp. 511-518, 2001. http://research.microsoft.com/~viola/Pubs/ Detect/violaJones_CV.PR2001.pdf.

(Continued)

*Primary Examiner* — Ishrat I Sherali
(74) *Attorney, Agent, or Firm* — Rabin & Berdo, P.C.

(57) ABSTRACT

In one exemplary embodiment, a face detection method implemented in a computer system estimates location and size of face candidate regions for an input image, which includes image regionalization, region labeling and feature capturing, distance transform, and face location and size estimation, to predict at least a face location and size range for the input image. According to the at least a predicted face location and size range, the method further performs an adaptive face detection until a predicted face region is verified.

15 Claims, 16 Drawing Sheets

(56) References Cited

OTHER PUBLICATIONS

Rainer Lienhart and Jochen Maydt, "An extended set of Haar-like features for rapid object detection," Proc. IEEE International Conference on Image Processing, pp. 900-903, 2002.

C. H. Messom, and A. L. C. Barczak, "Fast and Efficient Rotated Haar-like Features Using Rotated Integral Images," Australian Conference on Robotics and Automation (ACRA2006), pp. 1-6, 2006.

Robert E. Schapire, Yoav Freund, Peter Bartlett, and Wee Sun Lee, "Boosting the margin: A new explanation for the effectiveness of voting methods," Proc. of the Fourteenth International Conference on Machine Learning, 1997.

C. Lee, M. T. Schramm, M. Boutin, and J. P. Allebach, "An algorithm for automatic skin smoothing in digital portraits," Proc. IEEE International Conference on Image Processing (ICIP), pp. 3149-3152, 2009.

X.-W. Zhang, L.-Y. Liang, D.-Q. Duan and W.-L. Xia, "A novel method of face detection based on fusing YCbCr and His color space," Proc. International Conference on Automation and Logistics, pp. 831-835, 2009.

P. Ruangyam, and N. Covavisaruch, "An efficient region-based skin color model for reliable face localization," Proc. the 24th International Conference on Image and Vision Computing New Zealand, pp. 260-265, 2009.

Ming Hu; Qiang Zhang; Zhiping Wang, "Application of rough sets to image pre-processing for Face detection," Proc. International Conference on Information and Automation, pp. 545-548, 2008.

Linsheng Li, Yongliang Zhang, and Qichuan Tian, "Multi-face Location on Embedded DSP Image Processing System," Congress on Image and Signal Processing, pp. 124-128, 2008.

\* cited by examiner

| WINDOW SIZE | 24×24 | 28×28 | 34×34 | 41×41 | 49×49 | 59×59 | 71×71 |
|---|---|---|---|---|---|---|---|
| SUB-IMAGE | 149×109 | 147×107 | 144×104 | 140×100 | 136×96 | 131×91 | 125×85 |
| WINDOW SIZE | 85×85 | 103×103 | 123×123 | 148×148 | 178×178 | 213×213 | |
| SUB-IMAGE | 118×78 | 109×69 | 99×59 | 87×47 | 72×32 | 54×14 | |

FIG. 1 (PRIOR ART)

SYSTEM AND METHOD FOR FACE DETECTION USING FACE REGION LOCATION AND SIZE PREDICTIONS AND COMPUTER PROGRAM PRODUCT THEREOF

TECHNICAL FIELD

The disclosure generally relates to a system and method for face detection using face region location and size predictions, and computer program product thereof.

BACKGROUND

The contemporary human face detection algorithm usually uses pattern matching to determine the face location and size, mainly including sub-image capturing and sub-image face detection. The sub-image capturing allows the windows of different sizes to use overlapping to divide the source image into a plurality of sub-images, as shown in FIG. 1. The table in FIG. 1 shows the number of sub-images generated for different window size when the source image is 320×240.

Because the computer cannot predict the human face location, the sampling approach by overlapping method is to capture the sub-image sequentially separated by a plurality of pixels. For example, when window size is 24×24, with 2-pixel separation, 149×109 sub-images of 24×24 size will be obtained. Because computer cannot predict the size of human face either, patterns of different scales are used to scan the entire image. For example, first the window size is set to 24×24, and the window size is gradually expanded the window size by a factor of 1.2. Therefore, the window sizes would be 24×24, 28×28, 34×34, 41×41, 49×49, . . . , 213×213, and so on. Take FIG. 1 as an exemplar, the sequential capturing and the patterns of different scales will generate a large amount of data for comparison.

The face verification of sub-image is usually performed through capturing a plurality of features in the sub-image and using a classifier to analyze, for example, Haar-like based features in combination with cascade multiple-classifier algorithm is commonly used. The computation of Haar-like features is to obtain the difference between the sums of pixels in neighboring rectangles at special location within the detection window. FIG. 2 shows four common Haar-like feature types. Adaboost (adaptive Boosting) algorithm is an algorithm combining a plurality of weak classifiers to achieve a strong classifier.

The strategy of cascading of a plurality of classifiers is to design a plurality of Adaboost classifiers of different scales, and then cascade together from lower scale (using small number of Haar-like features) to high scale (using large number of Haar-like features). For example, as shown in FIG. 3A and FIG. 3B. Through capturing a plurality of features of different scales of sub-images (as shown in FIG. 3A), and using n cascaded Adaboost classifiers (as shown in FIG. 3B). When a sub-image is verified as a human face, the sub-image must have passed verification by all the Adaboost classifiers. When classifier of any scale determines that the sub-image is non-face, no more verification through Adaboost classifiers of subsequent higher scales is required.

The current human face detection speedup schemes are mostly based on skin color. By using skin filter to divide the inputted image into skin and non-skin pixels, these algorithms then performs face detection in skin mask. For example, a U.S. patent disclosed a technique for face detection through the detection of eye location. This technology uses a plurality of scales of eye modules to search sequentially the entire image, and then uses Haar-like based Adaboost classifiers to find the possible locations of eyes. Through template matching, this technology first verifies the detected eye location candidates and then uses classifiers to analyze the detection result to find the final face region. Another speedup algorithm based on skin color for face detection discloses a technique to label the non-skin region and then uses sequential search of different scales to verify all the sub-images. When a sub-image is found to have a low score, the neighboring sub-images are omitted and all the results are merged to obtain the final result for face detection.

Other skin-based face detection speedup schemes use wavelet transform to obtain features after labeling non-skin regions, and then use different scales of T-shaped template to sequentially search and verify all the sub-images. The results of all sub-images are merged to obtain the final result for face detection. Or, after labeling non-skin regions, these algorithms estimate the skin possible set for a single frame and assume that the maximum set is human face region and then use the skin color information obtained from a single frame for face tracking on the video image streams.

Basically, the skin-based face detection speedup schemes are time-consuming since they use different size templates to match the entire image sequentially. In general, the skin-based face detection speedup schemes are not suitable for grayscale images. How to solve the existing problem and provide a technique applicable to both color or gray-scale image to reduce unnecessary matching in the schemes remains an important issue.

SUMMARY

The exemplary embodiments of the disclosure may provide a system and method for face detection using face region location and size predictions and computer program product thereof.

A disclosed exemplary embodiment related to a method for face detection using face region location and size predictions, implemented in a computer system. The method comprises: performing face candidate region location and size predictions on an input image, including image regionalization, region labeling and feature capturing, distance transform with constraint, and face location and size estimation, to predict at least a face location and size range for the input image; and according to the at least a predicted face location and size range, performing an adaptive face detection, including establishing face detection range, establishing window size range used for face detection, and dynamically determining at least an optimal face location for each scale of a pre-defined number of scales until a predicted face region being verified and a final face detection result being outputted.

Another disclosed exemplary embodiment related to a system for face detection using face region location and size predictions. The system comprises a processor and a detector. The processor further includes an image regionalization module, a region labeling and feature capturing module, a distance transform with constraint module and a face location and size estimation module to perform face candidate region location and size predictions on an input image. The detector performs an adaptive face detection according to at least a predicted face location and size range. After a predicted face region is verified, a final face detection result is outputted.

Yet another disclosed exemplary embodiment related to a computer program product for face detection using face region location and size predictions. The computer program product comprises a memory and an executable computer program stored in the memory. The computer program includes the instructions to perform face candidate region location and size estimation and adaptive face detection, and execute via processor: performing face candidate region location and size predictions on an input image, including image regionalization, region labeling and feature capturing, distance transform with constraint, and face location and size estimation, to predict at least a face location and size range for the input image; and according to the at least a predicted face location and size range, performing an adaptive face detection, including establishing face detection range, establishing window size range used for face detection, and dynamically determining at least an optimal face location for each scale of a pre-defined number of scales until a predicted face region being verified and a final face detection result being outputted.

The foregoing and other features, aspects and advantages of the present invention will become better understood from a careful reading of a detailed description provided herein below with appropriate reference to the accompanying drawings.

BRIEF DESCRIPTION OF THE DRAWINGS

FIG. 1 shows an exemplary table of numbers of sub-images captured through different size of windows.

DETAILED DESCRIPTION OF THE EXEMPLARY EMBODIMENTS

Whether the input image is color or gray-scale, the exemplary embodiments of the disclosure provide a face detection technology based on face region location and size estimation, which use distance transform with constraint to analyze distance map, i.e., the distance transform result, to accomplish the face location and size estimation. Then, face matching with specific scale templates is performed on these locations to reduce unnecessary matching.

Figure 2:
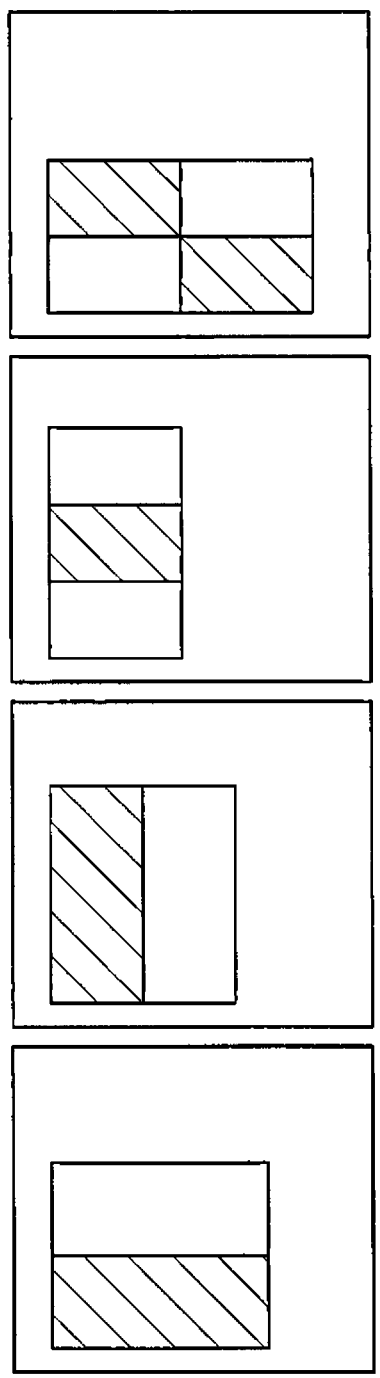
FIG. 2 shows an exemplary schematic view of four common Haar-like feature styles.
Figures 3A, 3B:
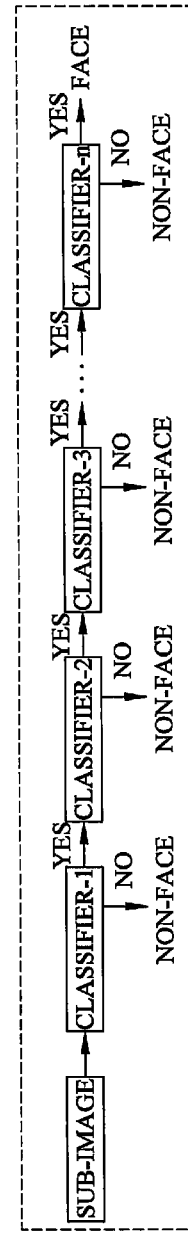
FIG. 3A and FIG. 3B show an exemplary view of cascaded classifiers and the number of features used in each classifier.
Figure 4:
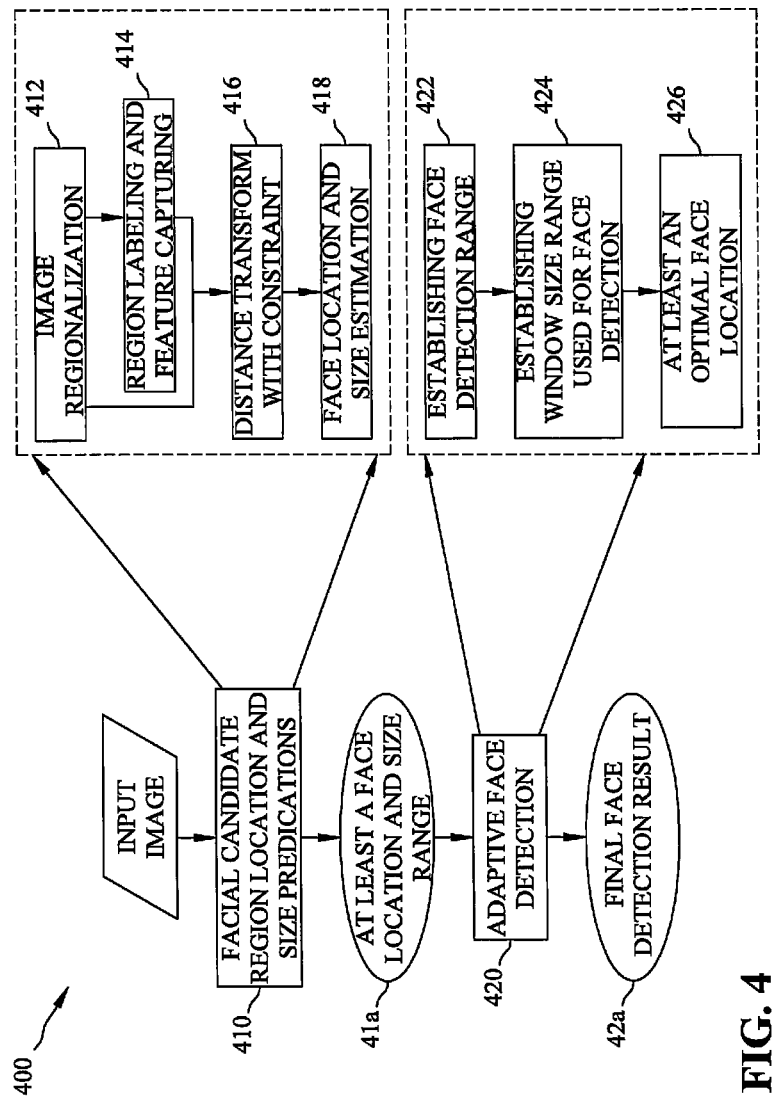
FIG. 4 shows an exemplary schematic view of a method for face detection using face region location and size predictions, consistent with certain disclosed embodiments.

As shown in FIG. 4, the method for face detection using face region location and size predictions includes two major parts. One part is to perform face candidate region location and size estimation 410 on an input image, including image regionalization 412, region labeling and feature capturing 414, distance transform with constraint 416, and face location and size estimation 418, to predict at least a face location and size range 41a for the input image. The other part is, according to the at least a predicted face location and size range, to perform an adaptive face detection 420, including establishing face detection range 422, establishing window size range used for face detection 424, and dynamically determining at least an optimal face location 426 for each scale of a pre-defined number of scales until a predicted face region is verified and a final face detection result 42a is outputted.

The face detection method is implemented in a computer device or system. The computer device or system may include a processor, a memory, an input device, an output device, and a storage device. The memory or the storage device may store executable program instructions. The program instructions may implement the method for face detection using face region location and size predictions, as shown in FIG. 4.

Face candidate region location and size estimation 410 belongs to a non-template matching approach. The operation is described as follows. First, image regionalization is performed on an input image, that is, by dividing an input image into a plurality of regions. Then, a connected component labeling scheme is applied to the plurality of divided regions, i.e., a plurality of sub-images after regionalization, and a specific label is assigned to each of at least a connected region of the plurality of divided regions, and the feature of the connected region, such as region size, is computed. For the plurality of regionalized sub-images, a distance transform with constraint is performed according to the specific label and the region feature. That is, a new mask image is established and a distance transform is performed on the new mask image to generate a distance map. The distance map represents the nearest distance between each pixel of the foreground object and the background pixel of the input image. Then, the result of the distance transform, i.e., the distance map, is analyzed to predict the face location and size range.

Figure 5:
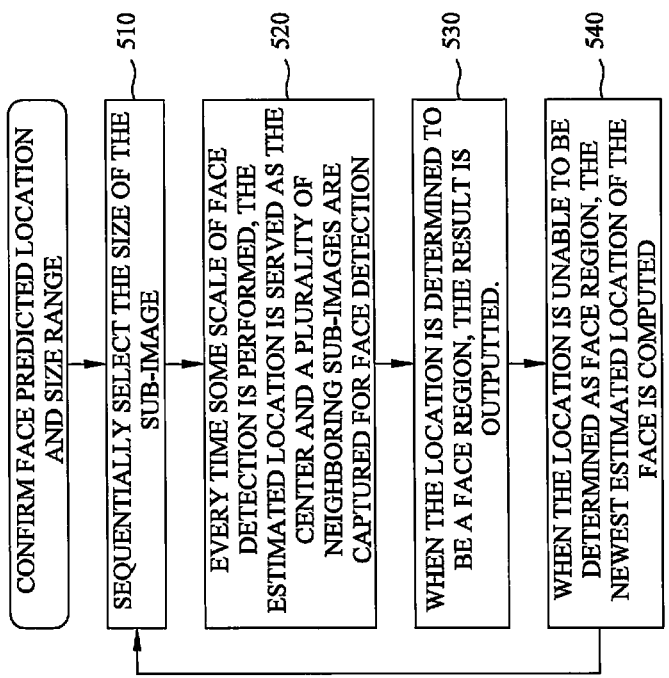
FIG. 5 shows an exemplary flowchart of adaptive face detection, consistent with certain disclosed embodiments.

Adaptive face detection 420 is described as follows. As shown in FIG. 5, after confirming the face estimation location and size range, a predefined number of scales are given to the estimated face location, and the size of the sub-image is sequentially selected (step 510) to perform the finite range sub-image capturing for face detection. Every time some scale of face detection is performed, the predicted location is served as the center and a plurality of neighboring sub-images are captured for face detection (step 520). When the location is determined to be a face region, the result is outputted (step 530) without subsequent higher scale face detection. When the location is unable to be determined as a face region, the newest estimated location of the face is computed (step 540) and the process returns to step 510 for the next scale face detection.

Figure 6A:
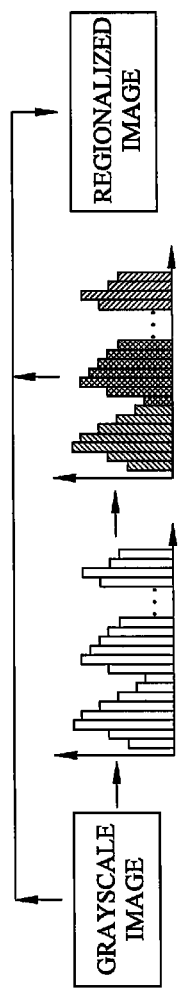
FIG. 6A and FIG. 6B show an exemplary schematic view of using clustering for image regionalization, consistent with certain disclosed embodiments.
Figure 6B:
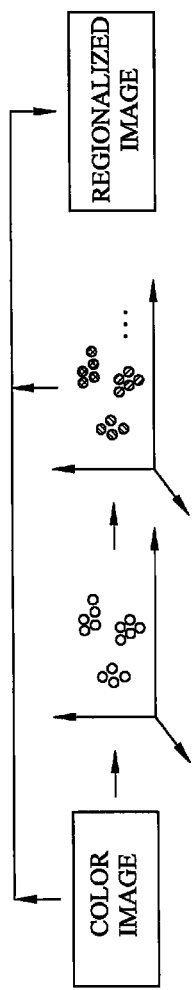

In image regionalization 412 of face candidate region location and size estimation 410, the input image may be either grayscale image or color image. According to the color characteristics, a conventional skin filter may be used to divide all the pixels in the color image into skin pixels and non-skin pixels. This type of image regionalization is very simple, and the detailed operation is omitted here. In addition, a clustering method may be used to cluster the histogram corresponding to the input image, and then restores the histogram clustering result to the original image to meet the requirements of image regionalization. The x-axis of the histogram is the intensity (color) of the image pixel, ranging from 0 to 255. The y-axis is the number of pixels corresponding to the input image. FIG. 6A and FIG. 6B show exemplary schematic views illustrating clustering-based image regionalization, consistent with certain disclosed embodiments. FIG. 6A shows the clustering processing on the 1-dimensional histogram corresponding to the grayscale image to generate a regionalized image, and FIG. 6B shows the clustering processing on the 3-dimensional histogram corresponding to the color image to generate a regionalized image. When the input image is a color image, the histogram is not restricted to 3-dimensional histogram, a 1-dimensional or higher histogram will be sufficient.

Figure 7C:
FIG. 7C shows an exemplary result of applying 3-dimentional clustering in FIG. 6B, consistent with certain disclosed embodiments.
Figure 7B:
FIG. 7B shows an exemplary result of applying 1-dimentional clustering in FIG. 6A, consistent with certain disclosed embodiments.
Figure 7A:
FIG. 7A shows an exemplary binary image generated by applying a skin filter on a color image for image regionalization, consistent with certain disclosed embodiments.

FIG. 7A shows a binary image generated by skin filtering on a source color image. FIG. 7B is the result obtained by performing 1-dimensional clustering in FIG. 6A. FIG. 7C is the result obtained by performing 3-dimensional clustering in FIG. 6B. FIG. 7B is the regionalized result restored via three clusters, i.e., three colors. FIG. 7C is the regionalized result via multiple clusters (more than 3 colors). The regionalized result will be more prominent when indicated by different colors.

Figure 8C:
FIG. 8A, FIG. 8B and FIG. 8C show the results of performing connected component labeling on FIG. 7A, FIG. 7B and FIG. 7C, respectively, consistent with certain disclosed embodiments.
Figure 8B:
Figure 8A:
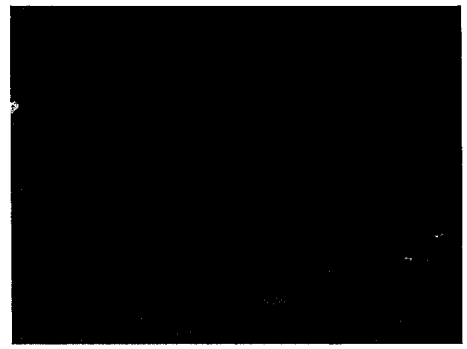
Figure 9C:
FIG. 9A, FIG. 9B and FIG. 9C show new mask images established according to FIG. 8A, FIG. 8B and FIG. 8C, respectively, consistent with certain disclosed embodiments.
Figure 9B:
Figure 9A:

FIG. 8A, FIG. 8B and FIG. 8C show the results of performing connected labeling on FIG. 7A, FIG. 7B and FIG. 7C, respectively. In FIG. 8A, only the white regions, i.e., skin regions, are labeled, and while in FIG. 8B and FIG. 8C, all regions are labeled because each cluster represents a region. The labeling result is provided to the next stage of distance transform with constraint. In the distance transform with constraint, the new mask image is established first, and then distance transform is performed on the new mask image. FIG. 9A, FIG. 9B and FIG. 9C are the new mask images established according to FIG. 8A, FIG. 8B and FIG. 8C respectively.

Figure 10A:
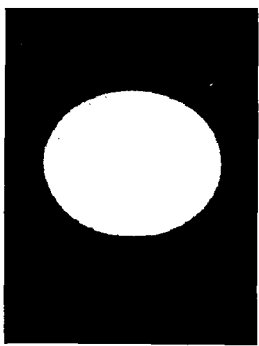
FIG. 10A and FIG. 10C show the new mask images established according to the regionalization result in ideal situation and actual situation, respectively, consistent with certain disclosed embodiments.
Figure 10B:
FIG. 10B and FIG. 10D show the results of distance transform on FIG. 10A and FIG. 10C, respectively, consistent with certain disclosed embodiments.
Figure 10C:
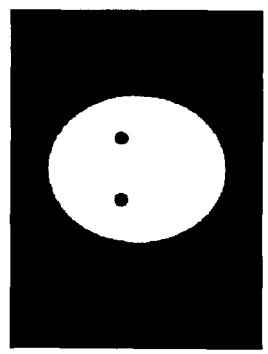
Figure 10D:
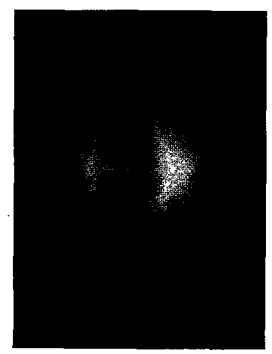

After establishing new mask image, the distance transform may be used to find the possible face location and size. However, because the noise may exist in the regionalized result, the distance transform may not be completely effective. For example, as shown in FIG. 10, FIG. 10A and FIG. 10C show the new mask image (size=320×240) established after regionalization in ideal and actual situations, and FIG. 10B and FIG. 10D are the result of FIG. 10A and FIG. 10C after distance transform, respectively, i.e., distance map. In the distance map, the brighter pixels are further away from the background.

In the distance map of FIG. 10B resulted from distance transform on mask image of FIG. 10A, the maximum distance is 54, and a possible face location is predicted to be located at the brightest location in the figure, and the face size is predicted as 108×08, where the maximum distance is also the value at the brightest point. In actual situation, two black dots, i.e., noises, appear in the mask image of FIG. 10C so that the maximum distance is 39 in the distance map of FIG. 10D after the distance transform. When following the same manner to estimate the face location and size, the predicted location in actual situation is lower than the predicted location in the ideal situation, and predicted face size in actual situation is only 78×78, also smaller than in the ideal situation. In other words, noises appear inside the face region, such as eye, glasses, and so on, unpredicted erroneous estimation will be made. Therefore, the disclosed exemplary embodiments provide distance transform with constraint to rectify possible erroneous estimation.

Figure 11:
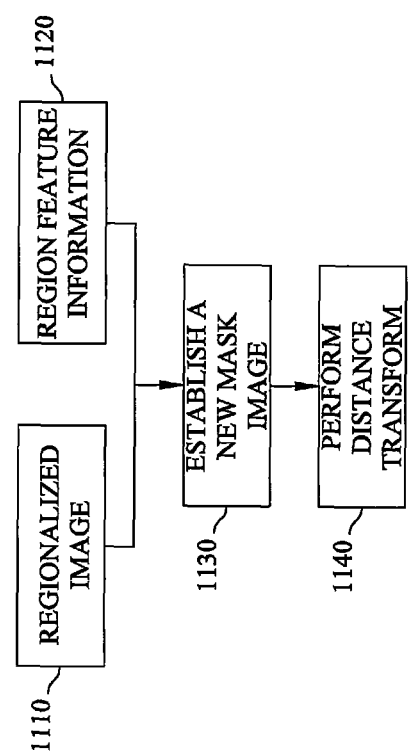
FIG. 11 shows an exemplary schematic view illustrating the operation flow of distance transform with constraint, consistent with certain disclosed embodiments.
Figure 12C:
FIG. 12A, FIG. 12B and FIG. 12C show the distance maps obtained by performing distance transform on FIG. 9A, FIG. 9B and FIG. 9C, respectively, consistent with certain disclosed embodiments.
Figure 12B:
Figure 12A:

As shown in FIG. 11, the method of distance transform with constraint establishes a new mask image 1130 according to a regionalized image 1110 and region feature information 1120, and then performs distance transform 1140 on mask image 1130 to obtain the final result. The following describes the corresponding strategies regarding the two disclosed image regionalization schemes when establishing a new mask image. When using a skin filtering scheme for image regionalization, the background region with area less than a predefined threshold is considered as a foreground region. When using a clustering scheme for image regionalization the neighboring pixels of two large-area neighboring regions are considered as background pixels. In other words, the noise in a small region is neglected to avoid the unpredictable erroneous estimation result. FIG. 9A, FIG. 9B and FIG. 9C are mask images established according to the corresponding strategies, and FIG. 12A, FIG. 12B and FIG. 12C are the distance map obtained after the distance transform performed on the figures of FIG. 9A, FIG. 9B and FIG. 9C, respectively.

Figure 13B:
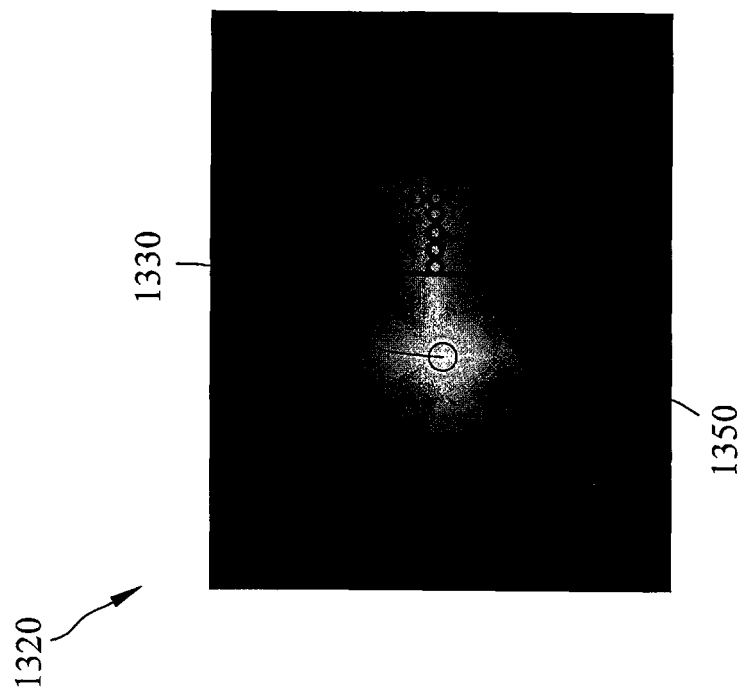
FIG. 13A and FIG. 13B show exemplary schematic views illustrating face location and size estimations, consistent with certain disclosed embodiments.
Figure 13A:
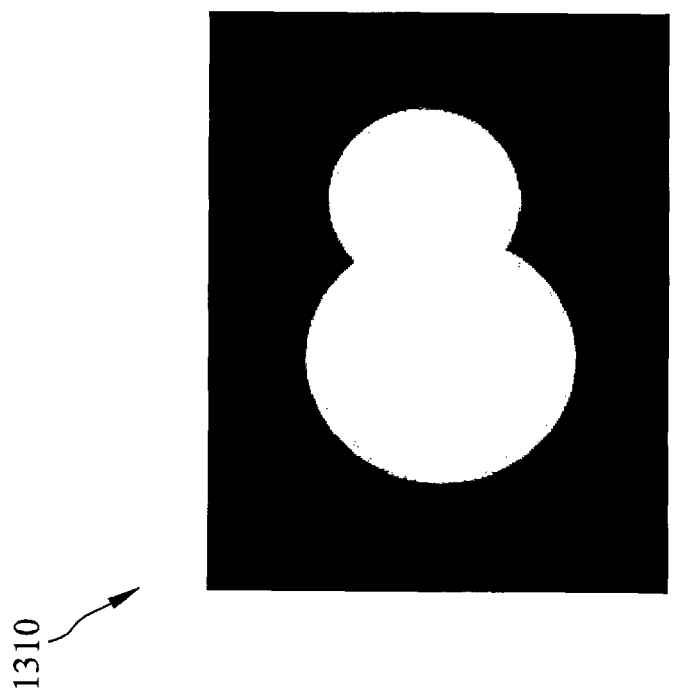

The face location and size predictions are based on the result of the distance transform with constraint. The disclosed face location and size estimation may include two parts. One part for face location estimation is according to the maximum distance value of each region in the distance map. The other part for face size estimation is according to the distance value of the predicted location. As shown in FIG. 13A and FIG. 13B, FIG. 13A shows a mask image 1310 established according to the disclosed exemplary embodiments and FIG. 13B shows distance map 1320 transformed from mask image 1310 according to distance transform with constraint. The maximum distance value in all the regions of distance map 1320 is located at the brightest point 1330. Therefore, face location is estimated to be located at brightest point 1330. Face size estimation may be estimated by, say, width=height=2×(distance value of estimated location). When the distance value of brightest point 1330 is 54, face size is estimated as 108×108, as the size of square 1350.

Figure 14:
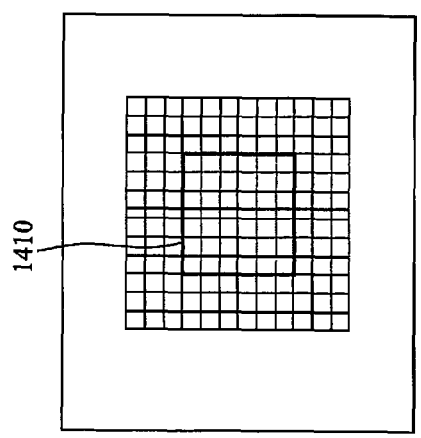
FIG. 14 shows an exemplary schematic view of establishing face detection range, consistent with certain disclosed embodiments.

With initial estimations of face location and size, the disclosed exemplary embodiments further provide adaptive face detection, as shown in FIG. 4 and FIG. 5. In establishing face detection range 422, a plurality of windows will be added to the x-direction (left and right) and the y-direction (above and below) of the estimated window size with estimated center for prediction. The exemplar in FIG. 14 shows that estimated window size 1410, with 3 windows added to the x-direction and y-direction respectively. Therefore, for the predicted face location, the face detection process will be performed on the sub-images of the 49 neighboring regions, wherein the distance location of each sub-image will vary according to the sub-image at the time of detection. The distance location of each sub-image may be expressed by, say, distance pixel=0.1×sub-image. When the sub-image is 24×24, the distance location of each sub-image may be defined as two pixels, i.e., the number of pixels is approximately [0.1×24].

In establishing face detection window size range 424, the originally estimated window size will be mapped to the nearest sub-image size, for example, the size shown in the table of FIG. 1. Then, the (−n, +n) range will be used to determine the window size range of face detection. Let n be 2, and the (−2, +2) range will be used to determine the face detection window size range. For example, the originally estimated window size is 40×40. The mapped sub-image size is 41×41, and the entire search range is from 28×28 to 59×59.

After confirming the face location and size range predictions, a pre-defined number of scales are given to the predicted face location. For each scale in the pre-defined number of scales, it may dynamically determines at least an optimal face location 426, as shown in steps 510-540 of FIG. 5. The details of the operations will not be repeated here.

Because the face candidate region location and size predictions are non-template matching, and only pre-defined scale template matching is performed after the face location and size range predictions are confirmed, the unnecessary matching is greatly reduced. In comparison with the conventional skin-based template-matching face detection techniques, the disclosed exemplary embodiments show great improvement in speedup efficiency. In addition, whether the input image is grayscale image or color image, the face detection of the disclosed exemplary embodiments may be applied. In the mean time, because the disclosed exemplary embodiments provide adaptive face detection, the correctness rate of face detection is also high.

Figure 15:
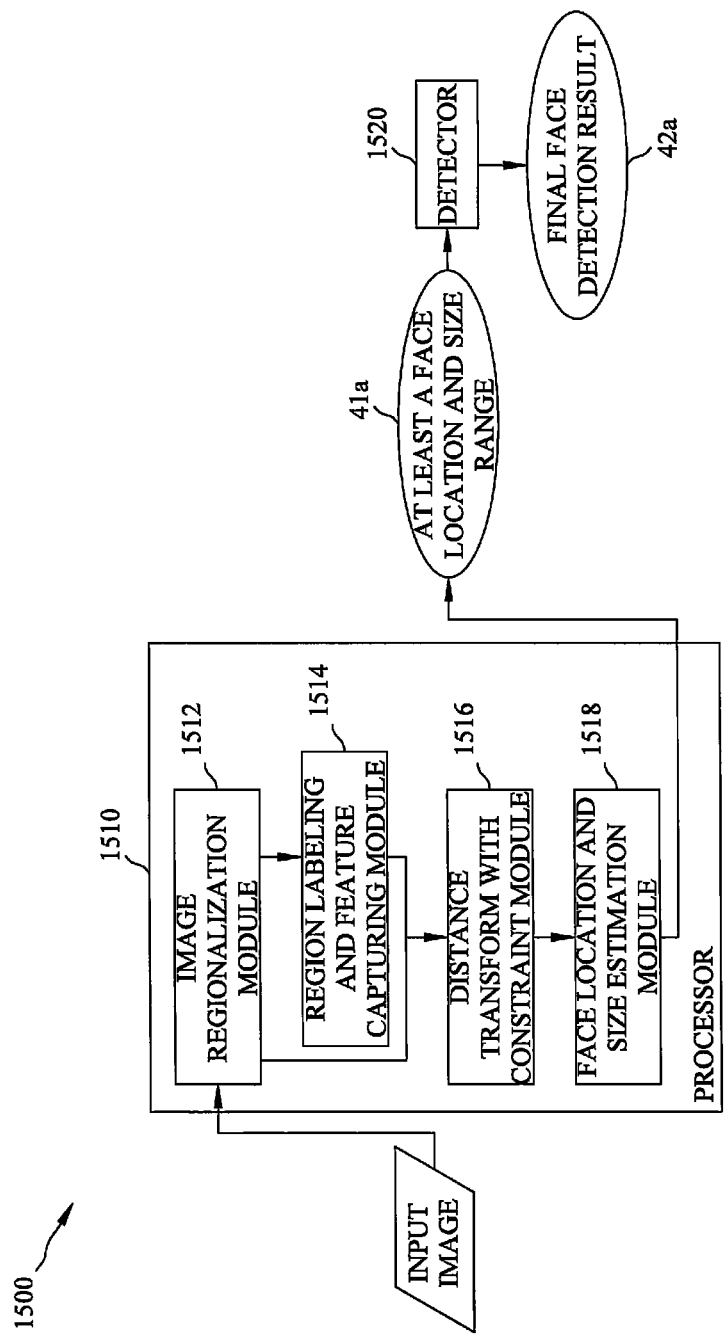
FIG. 15 shows an exemplary schematic view of a system for face detection using face region location and size predictions, consistent with certain disclosed embodiments.

Accordingly, FIG. 15 shows an exemplary schematic view illustrating a system for face detection using face region location and size range predictions, consistent with certain disclosed embodiments. In FIG. 15, face detection system 1500 may comprise a processor 1510 and a detector 1520. Processor 1510 performs face candidate region location and size predictions on an input image, including image regionalization, region labeling and feature capturing, distance transform with constraint, and face location and size estimation, to predict at least a face location and size range for the input image, which may be performed by an image regionalization module 1512, a region labeling and feature capturing module 1514, a distance transform with constraint module 1516 and a face location and size estimation module 1518, respectively. Detector 1520, according to the at least a predicted face location and size range 41a, performs an adaptive face detection until the predicted face region is verified and the final face detection result 42a is outputted.

Image regionalization module 1512 performs image regionalization on an input image by dividing into a plurality of regions. Region labeling and feature capturing module 1514 uses a connected component labeling method to label a plurality of regionalized sub-images by giving a specific label to each connected component region, and computes the feature of the region. Distance transform with constraint module 1516 establishes a new mask image for the regionalized sub-images according to the specific label and the feature of the region and performs a distance transform on the new mask image to generate a distance map. Face location and size estimation module 1518 analyzes the distance map to predict the face location and size range of the input image. The operation details of each module are the same as above, and will not be repeated here.

Figure 16:
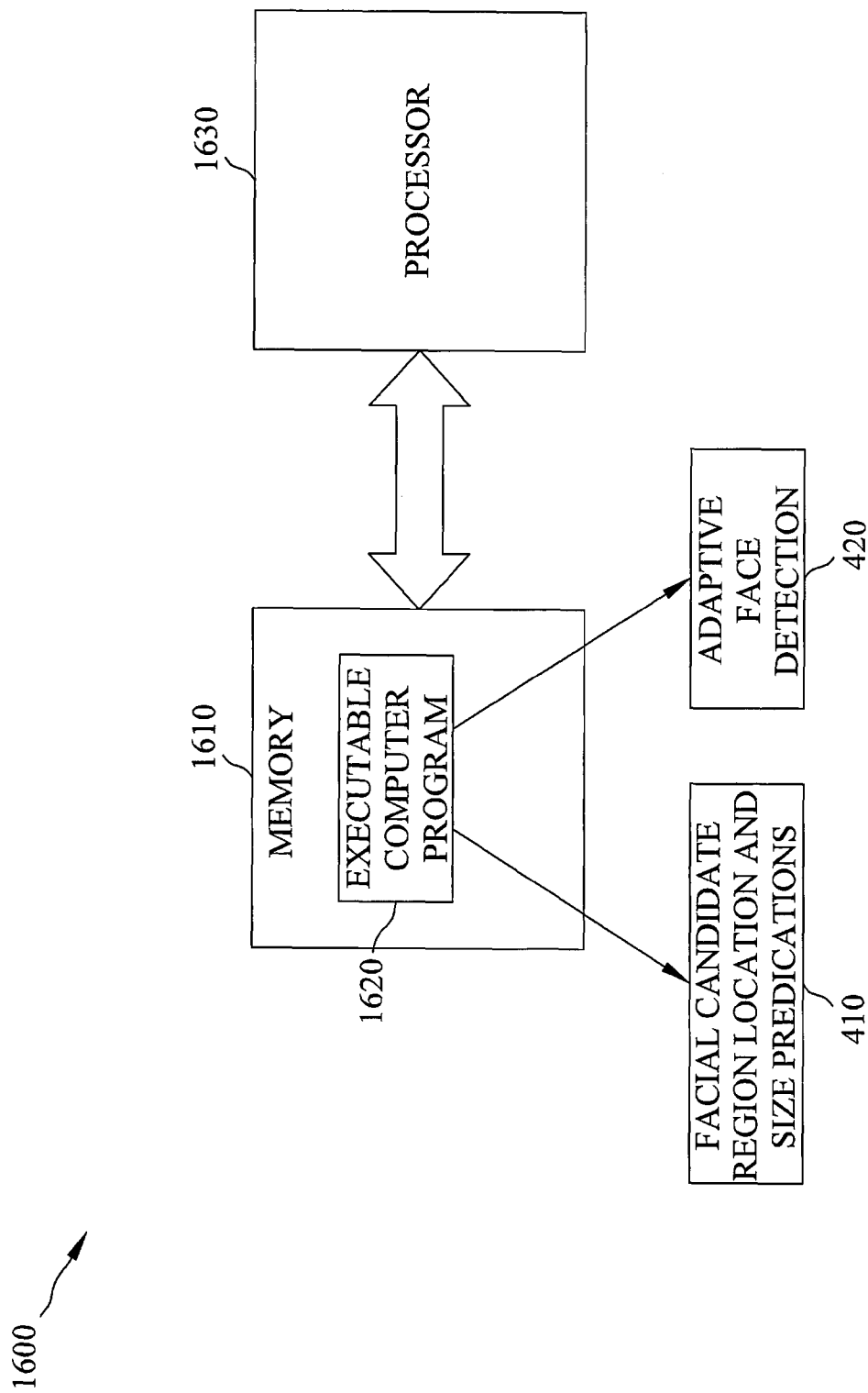
FIG. 16 shows an exemplary schematic view illustrating the method for face detection using face region location and size predictions of FIG. 4 implemented in a computer program product, consistent with certain disclosed embodiments.

In another disclosed exemplary embodiment, the face detection technique using face region location and size predictions may also be executed on a computer program product. As shown in FIG. 16, computer program product 1600 comprises a memory 1610 and an executable computer program 1620 stored in memory 1610. Computer program 1620 may include the instructions that may perform face candidate region location and size estimation 410 and adaptive face detection 420, and the instructions may be executed by a processor 1630 as follows: performing face candidate region location and size predictions on an input image, including image regionalization, region labeling and feature capturing, distance transform with constraint, and face location and size estimation, to predict at least a face location and size range for the input image; and according to the at least a predicted face location and size range, performing an adaptive face detection, including establishing face detection range, establishing window size range used for face detection, dynamically determining at least an optimal face location for each scale of a pre-defined number of scales until a predicted face region being verified and a final face detection result being outputted. That is, the operations of face detection using face region location and size estimation of FIG. 4.

In summary, the disclosed exemplary embodiments provide a system and method for face detection using face region location and size predictions and a computer program product thereof. Through fast non-template matching strategy to predict the face location and size, the face detection process uses region as a basis to rapidly obtain the face detection result. For some system with limited resources, such as, embedded systems, the data transmission amount may be reduced as well as power consumption. The face detection technique is applicable to both grayscale image and color image. The disclosed speedup scheme is also applicable to traffic sign detection, license plate detection, and so on.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for face detection using face region location and size predictions, applicable to a computer system, said method comprising the steps of:
    performing face candidate region location and size predictions on an input image, which including image regionalization, region labeling and feature capturing, distance transform with constraint, and face location and size estimation, to predict at least a face location and size range for said input image; and
    according to said at least a predicted face location and size range, performing an adaptive face detection, further comprising: establishing face detection range, establishing window size range used for face detection, and dynamically determining at least an optimal face location for each scale of a pre-defined number of scales until at least an optimal face region being verified as face location or all scales being verified, and outputting a final face detection result.

2. The method as claimed in claim 1, wherein said input image is one of grayscale image or color image.

3. The method as claimed in claim 1, wherein said image regionalization further includes:
  using a clustering method to cluster a histogram corresponding to said input image and then restores said histogram clustering result to an original source image.

4. The method as claimed in claim 3, wherein when said input image is a grayscale image, said histogram is a 1-dimensional histogram.

5. The method as claimed in claim 3, wherein when said input image is a color image, said histogram is an at least 1-dimensional histogram.

6. The method as claimed in claim 1, wherein said region labeling and feature capturing further includes:
  applying a connected component labeling scheme to a plurality of divided regions after the image regionalization, and assigning a specific label to each of at least a connected region of the plurality of divided regions; and
  computing at least a feature of the connected region of said at least a connected region.

7. The method as claimed in claim 6, wherein said distance transform with constraint further includes:
  establishing a new mask image according to said plurality of divided regions after the image regionalization, and said specific label and said at least a feature of each connected region after the region labeling and feature capturing; and
  performing a distance transform on said new mask image to generate a distance map.

8. The method as claimed in claim 7, wherein said distance map represents shortest distance between each pixel of a foreground object of said input image and its background pixel of said input image.

9. A system for face detection using face region location and size predictions, said system comprising:
  a processor, performing face candidate region location and size predictions on an input image, which further including image regionalization, region labeling and feature capturing, distance transform with constraint, and face location and size estimation; and
  a detector, according to at least a predicted face location and size range, performing an adaptive face detection until predicted face region being verified and a final face detection result being outputted.

10. The system as claimed in claim 9, wherein said processor uses an image regionalization module to perform image regionalization on said input image by dividing said input image into a plurality of regions.

11. The system as claimed in claim 10, wherein said processor uses a region labeling and feature capturing module to apply a connected component labeling scheme to assign a specific label to each of at least a connected region of a regionalized image after the image regionalization, and compute at least a feature of said connected region of said at least a connected region.

12. The system as claimed in claim 11, wherein said processor uses a distance transform with constraint module to establish a new mask image according to said plurality of regions after the image regionalization, and said specific label and said at least a feature of each connected region of said at least a connected region after the region labeling and feature capturing, and to perform a distance transform on said new mask image to generate a distance map.

13. The system as claimed in claim 12, wherein said processor uses a face location and size estimation module to analyze said distance map to predict face location and size range of said input image.

14. A computer program product, comprising a memory and an executable computer program stored in said memory, said computer program including instructions to perform face candidate region location and size estimation and adaptive face detection, and said instructions being executed as follows:
  performing, by using a processor, face candidate region location and size predictions on an input image, which including image regionalization, region labeling and feature capturing, distance transform with constraint, and face location and size estimation, to predict at least a face location and size range for said input image; and
  according to said at least a predicted face location and size range, performing, by using said processor, an adaptive face detection until a predicted face region being verified and a final face detection result being outputted.

15. The computer program product as claimed in claim 14, wherein said adaptive face detection further includes:
  establishing face detection range, establishing window size range used for face detection, and dynamically determining at least an optimal face location for each scale of a pre-defined number of scales.

* * * * *